United States Patent [19]

Kile

[11] 4,079,161

[45] Mar. 14, 1978

[54] TRANSPARENT ORIENTED POLYOLEFIN LAMINATED ARMOR STRUCTURE

[75] Inventor: Stephen A. Kile, Bartlesville, Okla.

[73] Assignee: Phillips Petroleum Company, Bartlesville, Okla.

[21] Appl. No.: 488,190

[22] Filed: Jul. 12, 1974

[51] Int. Cl.$^2$ .................. B32B 27/32; F41H 5/02; F41H 5/06; F41H 5/08
[52] U.S. Cl. ................... 428/220; 428/303; 428/332; 428/516; 428/910; 428/911; 89/36 D; 156/288; 89/36 C; 89/36 R; 89/36 A; 109/49.5; 109/78
[58] Field of Search .............. 161/165, 252, 402, 404; 89/36 R, 36 A, 36 D; 428/220, 303, 332, 516, 910, 911

[56] References Cited

U.S. PATENT DOCUMENTS

| T714,056 | 3/1968 | Hall | 161/252 |
| 3,415,710 | 12/1968 | Arnold | 161/402 |
| 3,508,944 | 4/1970 | Henderson et al. | 161/252 X |
| 3,671,383 | 6/1972 | Sakata et al. | 161/252 |
| 3,719,545 | 3/1973 | Lawler | 161/50 |

FOREIGN PATENT DOCUMENTS

| 1,188,968 | 4/1970 | United Kingdom | 161/59 |

*Primary Examiner*—P. C. Ives

[57] ABSTRACT

A transparent armor structure is provided by laminating multiple units consisting of one or more ply of unidirectionally oriented olefin polymer film formed by a fluid compression process. The units are positioned so that the lines of orientation of adjacent units are at angles to each other. Bonding of the plies is achieved solely through the application of heat and pressure to the composite of positioned plies.

5 Claims, No Drawings

TRANSPARENT ORIENTED POLYOLEFIN LAMINATED ARMOR STRUCTURE

This invention relates to laminated transparent armor materials and to a process for the production of same.

Although armor plate glass has generally been considered outstanding as armor plate material, for some purposes such plate material is undesirable due to the considerable weight involved and lack of flexibility when used in sufficient thickness to afford adequate protection. In recent years, a number of lightweight, opaque armor materials have been provided which can replace, entirely or in part, steel armor plate used heretofore. However, there still exists a need for a lightweight, transparent armor material for use as vehicle windshields, building glazing materials, and the like.

It is therefore an object of this invention to provide a lightweight, transparent armor structure.

Another object of this invention is to provide a process for the formation of laminated, transparent armor having a plurality of plies therein which are bonded together without having to utilize additional adhesive materials in combination with each of the plies thereof.

Other objects, aspects and the several advantages of this invention will be apparent from the following specification and claims.

In accordance with this invention there is provided a light-weight armor structure having high impact resistance, high resistance to shattering and good transparency. The armor structure of this invention is formed by compression-bonding a composite comprising a plurality of units of unidirectionally oriented olefin polymer film, wherein each of the units is so positioned that the directions of orientation of adjacent units are at an angle to each other and wherein the ply of each unit is positioned so that the direction of orientation of adjacent ply is the same. The transparent armor structure of this invention is provided by utilizing an oriented olefin polymer film formed by a fluid compression process.

As used herein, the term "ply" is intended to cover the single sheet of unidirectionally oriented olefin polymer film.

The term "unit" as used herein, is intended to cover a single composite of film having one or more ply therein and which is characterized by the fact that the direction of orientation of each ply therein is the same.

The synthetic linear olefin polymers used in the present invention are solid, high molecular weight products or mixtures thereof which are capable of being formed into films which can be drawn to a high percentage of elongation. Drawing of the film is accomplished by passing same through a heating zone wherein the film is exposed to an elevated temperature which is below the temperature at which the material becomes molten for a sufficient time to heat same above its ambient temperature and to render same orientable upon elongation so as to obtain films showing characteristic, molecular orientation along the direction of the draw in the plane of the film.

The film used in preparing the laminate structures of the present invention is drawn by a fluid compression process such as the process described in U.S. Pat. No. 3,503,843, issued Mar. 31, 1970, to Robert F. Williams, Jr. and Richard H. Jenks. Briefly, according to this process, drawing is accomplished by compression rolling an olefin polymer film with enough liquid lubricant in the nip area of the rolls to form a hydraulic "wedge". The film to be compression-rolled can be formed by either extrusion or casting. The film material is passed between rollers having a pressure sufficient to decrease the film to ½ to 1/10th its original thickness. A lubricant is used on the polyolefin film as it passes through the nip between the two rollers. This lubricant can be applied to either the polyolefin film directly or placed on the rollers so it is transferred to the film as it passes between the rollers. The temperature of the pressure rollers depends upon the density and the softening temperature of the polymer. The lubricant in this case acts to form a full or partial fluid film between the roll and the polyolefin film. Thus, the roll surface and the film are separated by the liquid lubricant which prevents contact and increases mobility as the film enters the nip. This results in effectively reducing the nip or load area which results in higher unit stresses for a given load. Compression rolling provides an oriented film having a draw ratio of from about 2:1 to about 7:1.

Olefin polymers which are suitable for forming the films to be used in the formation of the armor structure of this invention are those solid, orientable polymers formed by the polymerization of at least one monoolefin having from 2 to 8 carbon atoms therein. Such polymers include polyethylene, polypropylene, poly(1-butene), ethylene-1-butene copolymers, ethylene-propylene copolymers and the like, as well as blends or mixtures thereof. Such polymers are well known in the art and can be produced, for example, in accordance with the process of Hogan and Banks as set forth in U.S. Pat. No. 2,825,721. It should, however, be understood that the process for producing these synthetic linear olefin polymers from which the film of this invention is formed is not critical and they can be produced by any process which will provide a solid polymeric composition which is capable of achieving the desired degree of elongation.

In one embodiment of the invention, the oriented olefin polymer film employed in forming the units of the laminate is a self-bonding, compression-rolled, oriented polypropylene film which will retain its orientation when bonded by the application of heat and pressure.

In another embodiment of this invention, the oriented film which is utilized in forming the plies of the laminate is formed from a blend of 99 to 75 weight percent of polypropylene and 1 to 25 weight percent of polyethylene.

Each unit used in the formation of the laminate armor structure will generally contain from 1 to 100 plies or sheets of oriented olefin polymer film, wherein the direction of orientation of each ply is the same and wherein each ply has a thickness of 0.5 to 25.0 mils.

In the formation of the armor structure, the adjacent units of oriented film can be placed in any configuration so long as the direction of orientation of each unit differs. Preferably, the direction of orientation differs 90° but a lesser angular difference can be employed.

The total thickness of the laminated armor structure of this invention is dependent upon the end use to be made of the laminate and the desired protection to be provided.

Bonding of the units consisting of one or more plies to form the desired armor structure is carried out by subjecting the composite of positioned units to compression at elevated temperatures. Due to the unique nature of the ply-forming material, no additional adhesives or bonding agents are required in the formation of the desired laminate. The composite of units, after being positioned in the manner as herein described, is placed in a press and subjected to an elevated temperature below the softening point of the polymer composition at atmospheric pressure and to a pressure sufficient to achieve the desired lamination across the entire planar surface of the composite.

Ordinarily, a press plate temperature in the range of 50 to 200° C is employed. The pressure at which the press is operated is in the range of 50 to 100,000 psi and preferably 1,000 to 50,000 psi. However, both pressures and plate temperatures outside these ranges can be utilized in achieving bonding or lamination of the ply units although the above conditions for bonding are most suitable when utilizing conventional pressing apparatus.

The armor structure of this invention is useful apart from any other material. The armor structures of this invention have varying degrees of clarity or light transmission depending upon the total thickness of the laminate. Thus, protective armor suitable for face plates, windows and the like, where visibility or light transmission is required is provided by the instant invention.

The following example illustrates this invention.

EXAMPLE

A laminate structure in accordance with this invention was prepared as follows:

One hundred twenty single thickness plies of compression-rolled polypropylene film, having a draw ratio of 4.4:1 and a thickness of 1.1 mils, were stacked with the direction of orientation alternating between plies by 90°. The resulting composite was pressed at 8,000 psi in a press having a plate temperature of 300°F (149°C) for 45 minutes.

The press heaters were turned off and the composite was allowed to cool, under pressure, for 15 minutes. The resulting laminate was very clear with no haze evident; the laminate had an approximate areal density of 10 oz. per square foot.

The laminate structure prepared above was tested for resistance to penetration of a ballistic missile according to the procedure outlined in MIL-STD-662A. The result expressed below is in terms of $V_{50}$ limit. The $V_{50}$ limit is the calculated velocity of the test projectile at which the probability exists that 50 percent of the projectiles fired will completely penetrate the armor, and that 50 percent of the projectiles will be stopped by the armor. The projectile in all tests was a .22 calibre 17-grain fragment-simulating projectile. The laminate structure prepared above had a $V_{50}$ rating of 829 feet-per-second.

Reasonable variations and modifications, which will be apparent to those skilled in the art, can be made in this invention without departing from the spirit or scope thereof.

I claim:

1. A transparent laminated armor structure capable of precluding penetration of bullets and shell fragments which comprises a plurality of compression-bonded units of unidirectionally, fluid compression oriented olefin polymer film wherein each of said units is so positioned that the directions of orientation of adjacent units are at an angle to each other and wherein said units are compression-bonded in the absence of achesives or bonding agents.

2. A laminate in accordance with claim 1 containing 120 units of polypropylene film having a degree of orientation of 4.4:1, each of said units having a thickness of 1.1 mils, wherein the directions of orientation of adjacent units are at 90° to each other.

3. A laminated armor structure according to claim 1 wherein said unidirectionally oriented olefin polymer film is formed from a solid orientable polymer formed by the polymerization of at least one monoolefin having from 2 to 8 carbon atoms therein.

4. A laminated armor structure according to claim 1 wherein said unidirectionally oriented olefin polymer film is formed from an olefin polymer film having been drawn at a ratio in the range of 2:1 to 7:1.

5. A laminated armor structure according to claim 1 wherein said unidirectionally oriented olefin polymer film is a self-bonding solid, oriented polypropylene film which will retain its orientation when bonded by the application of heat and pressure thereto.

* * * * *